(12) United States Patent
Polehn et al.

(10) Patent No.: US 9,237,463 B2
(45) Date of Patent: Jan. 12, 2016

(54) PERFORMANCE PATTERN CORRELATION

(71) Applicants: Verizon Patent and Licensing, Inc., Basking Ridge, NJ (US); Cellco Partnership, Basking Ridge, NJ (US)

(72) Inventors: Donna L. Polehn, Kirkland, WA (US); Lalit R. Kotecha, San Ramon, CA (US); Patricia R. Chang, San Ramon, CA (US); Deepak Kakadia, Antioch, CA (US); John F. Macias, Antelope, CA (US); Priscilla Lau, Fremont, CA (US); Yee Sin Chan, San Jose, CA (US); Arda Aksu, Martinez, CA (US)

(73) Assignees: Verizon Patent and Licensing Inc., Bsaking Ridge, NJ (US); Cellco Partnership, Basking Ridge, NJ (US)

( * ) Notice: Subject to any disclaimer, the term of this patent is extended or adjusted under 35 U.S.C. 154(b) by 121 days.

(21) Appl. No.: 14/085,342

(22) Filed: Nov. 20, 2013

(65) Prior Publication Data

US 2015/0138989 A1 May 21, 2015

(51) Int. Cl.
*H04W 24/02* (2009.01)
(52) U.S. Cl.
CPC ..................... *H04W 24/02* (2013.01)
(58) Field of Classification Search
None
See application file for complete search history.

(56) References Cited

U.S. PATENT DOCUMENTS

| | | | |
|---|---|---|---|
| 2005/0053009 A1* | 3/2005 | Denby et al. | 370/250 |
| 2005/0144151 A1* | 6/2005 | Fischman et al. | 706/45 |
| 2006/0178858 A1* | 8/2006 | Trowbridge et al. | 703/2 |
| 2006/0227767 A1* | 10/2006 | Johnson et al. | 370/356 |
| 2010/0077077 A1* | 3/2010 | Devitt | 709/224 |
| 2012/0322438 A1* | 12/2012 | Bader | 455/424 |
| 2013/0117842 A1* | 5/2013 | Kakadia et al. | 726/22 |
| 2013/0242736 A1* | 9/2013 | Tarraf et al. | 370/235 |
| 2013/0268251 A1* | 10/2013 | Demuth et al. | 703/6 |
| 2014/0066117 A1* | 3/2014 | Egner et al. | 455/513 |
| 2015/0017975 A1* | 1/2015 | Sanneck et al. | 455/422.1 |

* cited by examiner

*Primary Examiner* — Benjamin H Elliott, IV

(57) ABSTRACT

A method includes identifying a plurality of network components in a network topology of a data transmission network, identifying data transmission performance patterns based on at least one key performance indicator (KPI) for each of the plurality of network components, identifying at least one data transmission issue in the network, and identifying a model degraded performance pattern associated with the at least one data transmission issue. The method may also include matching the model degraded performance pattern to the data transmission performance patterns to form matched performance patterns, and identifying a root-cause component from the network components based on the matched performance pattern.

20 Claims, 8 Drawing Sheets

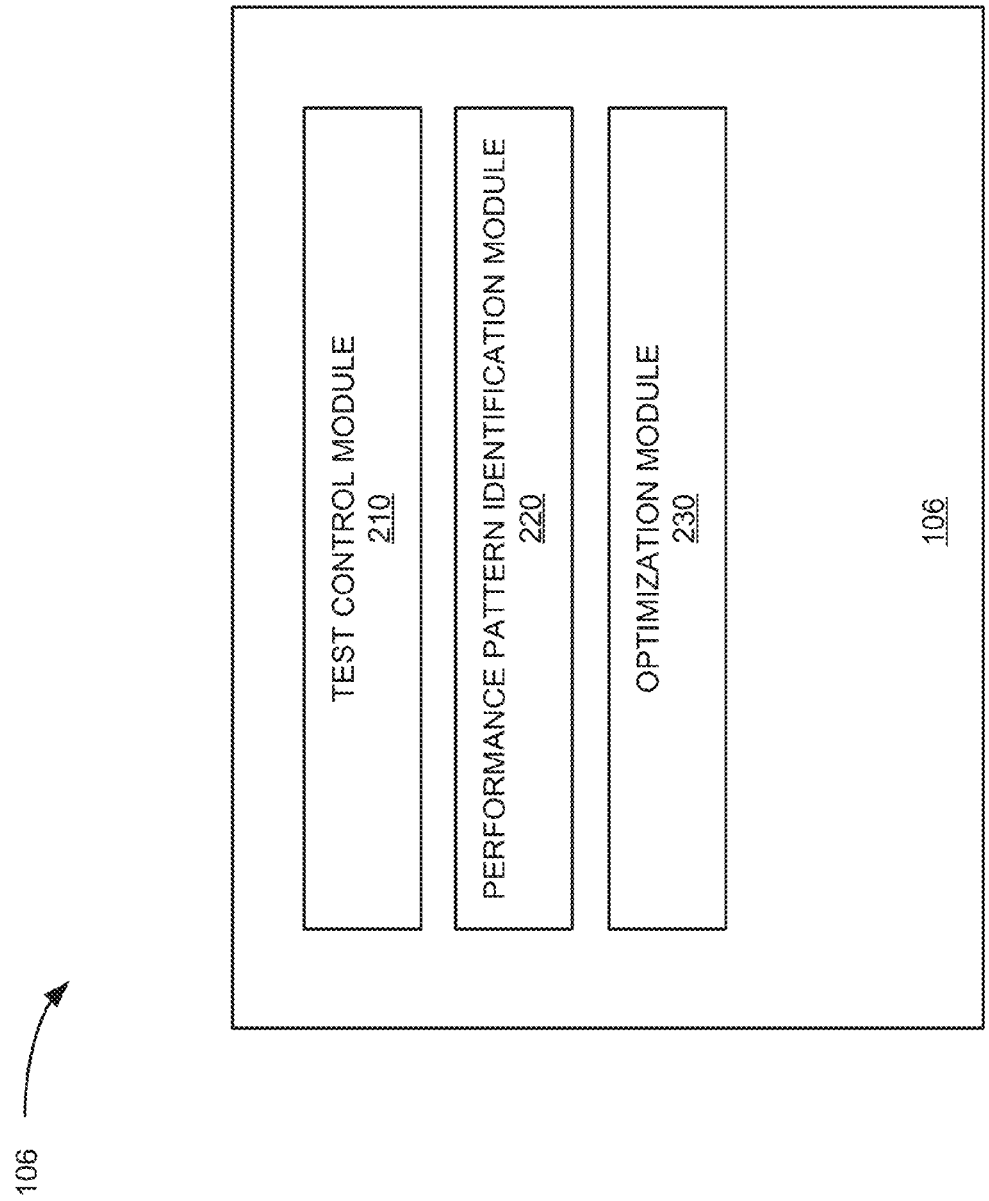

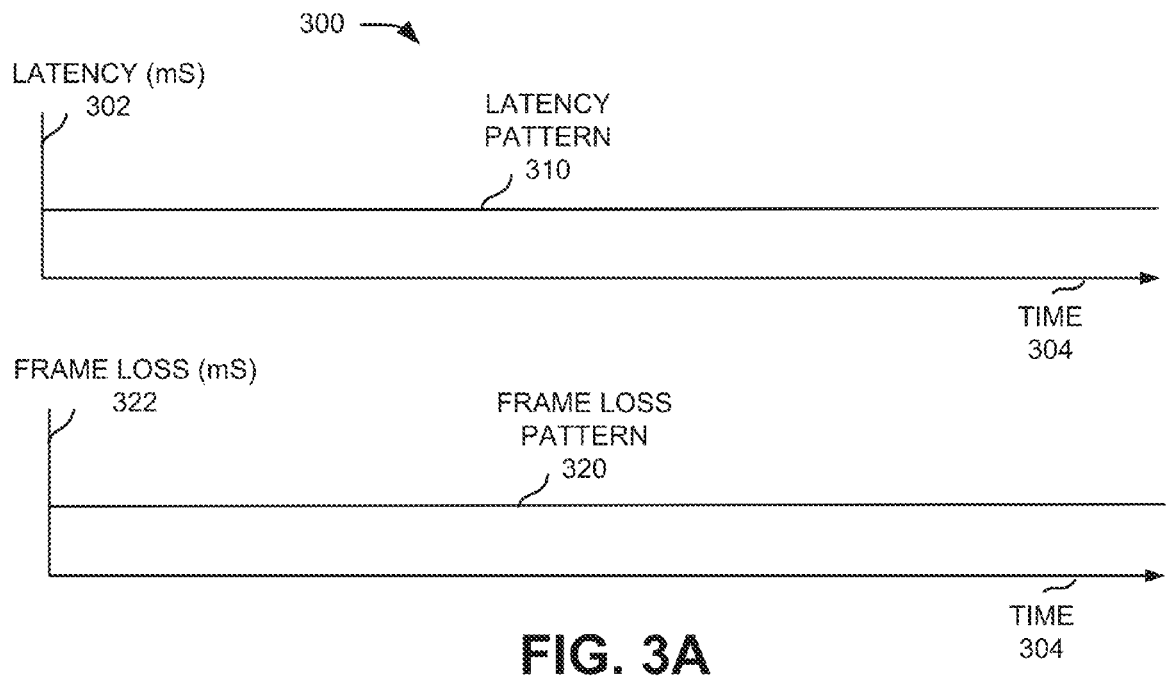
FIG. 3A
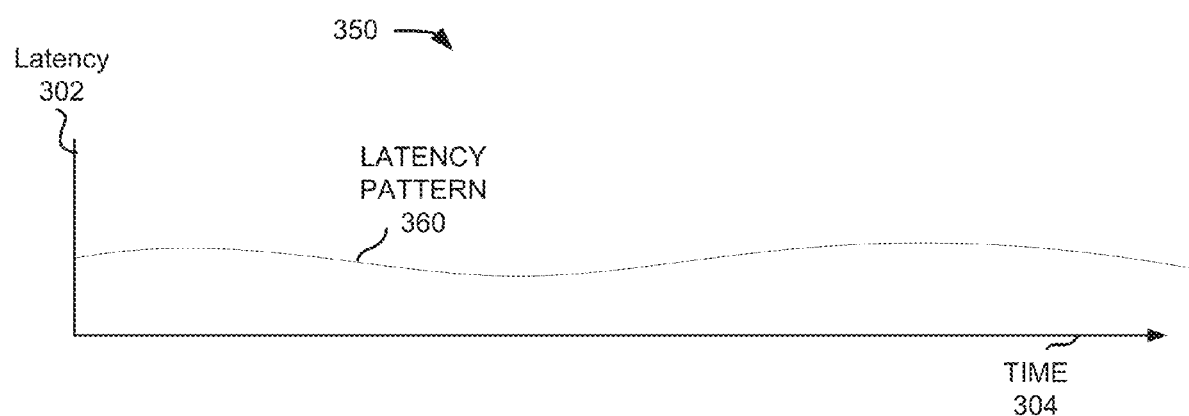
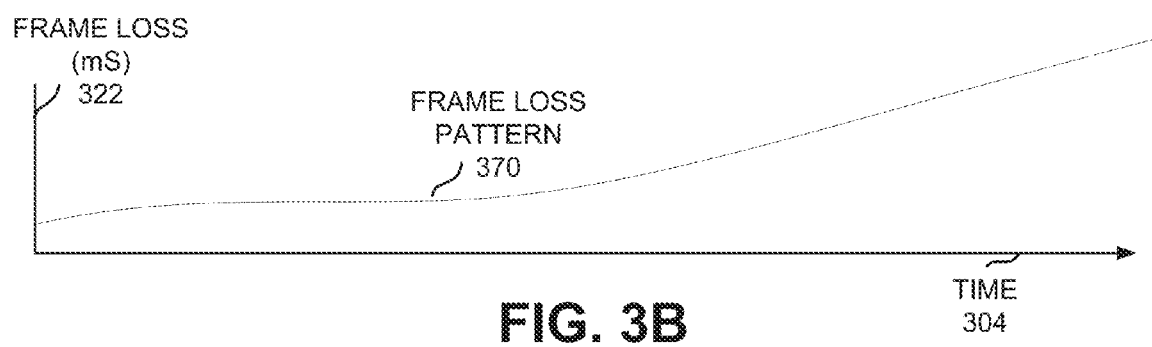
FIG. 3B

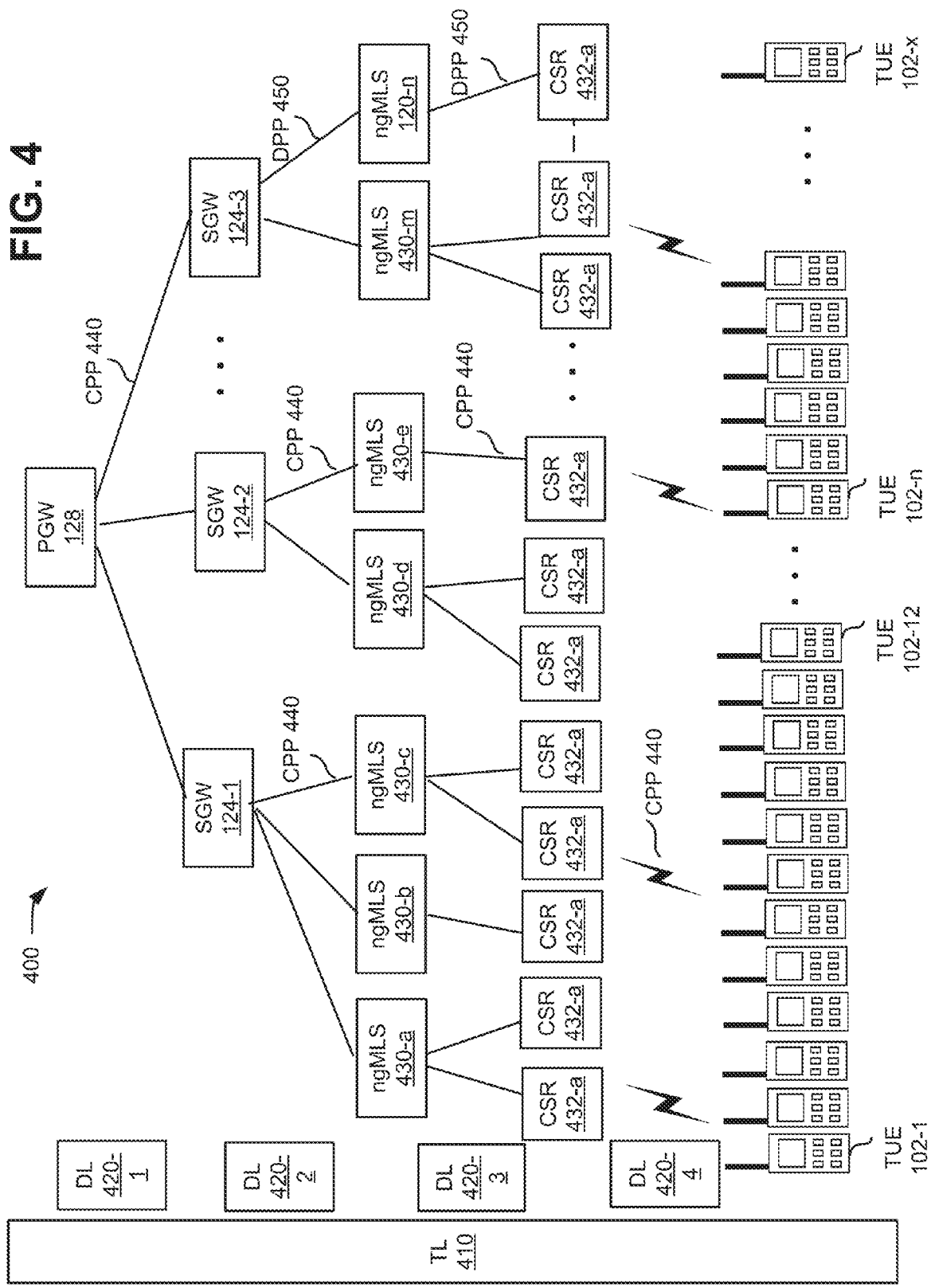

PERFORMANCE PATTERN CORRELATION

BACKGROUND

Voice and data networks may experience degradation of performance resulting from many different issues in the network. These issues may include backhaul issues, such as a noisy or failed link, an overloaded link, damaged cable, dirty fiber, a crashed server or an overloaded server; etc. Issues may also arise based on software problems, such as incorrect buffer settings, incorrect format for packets, excessively delayed packets, corrupt, or missing packets, corrupt routing tables, etc. Problems may be intermittent or continuous. Intermittent problems tend to be more difficult to diagnose than continuously present problems.

BRIEF DESCRIPTION OF THE DRAWINGS

FIG. 2 is a functional block diagram of components of the performance pattern match device of FIG. 1;

FIGS. 3A and 3B are exemplary diagrams illustrating performance patterns based on key performance indicators;

FIG. 4 is a block diagram of a network topology including data transmission links;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may identify a data transmission performance pattern based on measurement of key data transmission performance indicators over a time. The key data transmission performance indicators may include latency, jitter, frame loss, etc. In some instances, devices that communicate data over a network may receive degraded data. The systems may identify one or more root-cause components of degraded performance based on correlation between a degraded data transmission performance pattern and the root-cause component in a network. The root-cause component may be a network element associated with data transmission that introduces the data transmission issue into the network.

Consistent with embodiments described herein, the systems may monitor network performance and match performance changes/degradation to root-cause components and identify the solutions. The systems may be used in conjunction with self-optimizing tools to ensure peak performance of the network.

Figure 1:
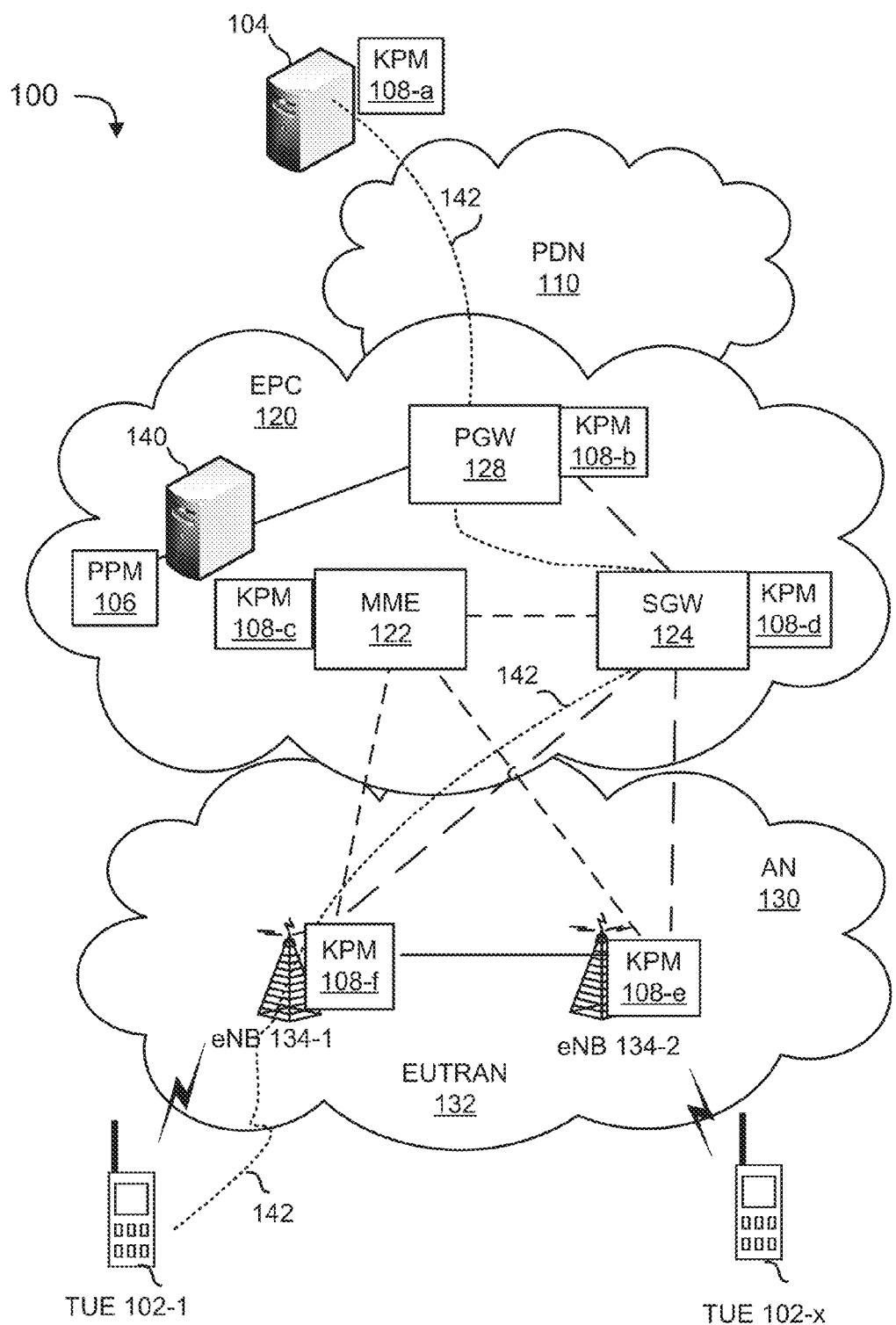
FIG. 1 is an exemplary network in which systems and/or methods described herein may be implemented.

FIG. 1 is a block diagram of an exemplary network 100 in which systems and methods described herein may be implemented. As illustrated, network 100 includes a number of test user equipment (TUE) devices 102-1, 102-2 and 102-x (collectively referred to as TUEs 102 or individually as TUE 102), an external test server 104, a performance pattern matching (PPM) device 106, a plurality of key process monitors 108, a packet data network (PDN) 110 (e.g., the Internet or a proprietary packet data network), an evolved packet core (EPC) network 120, and an access network (AN) 130. EPC 120 may include a mobility management entity (MME) 122, a serving gateway (SGW) 124, a PDN gateway (PGW) 128, and an internal test server 140. AN 130 may include an evolved universal terrestrial radio access network (E-UTRAN) 132 and a number of eNodeBs (eNBs) 134-1 and 134-2 or enhanced node base stations (collectively referred to as eNBs 134 or individually as eNB 134). Devices/networks of network 100 may interconnect via wired and/or wireless connections.

Two TUEs 102, two eNBs 134, a single external test server 106, PDN 110, EPC 120, AN 130, MME 122, SGW 124, PGW 128, E-UTRAN 132, and internal test server 140 have been illustrated in FIG. 1 for simplicity. In practice, there may be more or fewer devices or components. For example, a typical network 100 includes millions of subscriber user devices, thousands of eNBs 134, hundreds of SGWs 124 and several PGWs 128 effectively forming a hierarchical access network in which traffic passes from PDN 110 to TUE 102 via, for example, a particular PGW 128, SGW 124, and eNB 134. Although not shown, EPC 120 may include additional devices that facilitate network functions associated with the subscriber, such as a policy and charging rules function (PCRF) device, a broadcast multicast service center (BMSC), and a multimedia broadcast multicast service gateway (MBMS GW), a home subscriber server (HSS)/authentication, authorization, and accounting (AAA), etc.

TUE 102 may include any device that is capable of communicating over AN 130, EPC network 120, and/or PDN 110. For example, TUE 102 may include a radiotelephone, a personal communications system (PCS) terminal (e.g., that may combine a cellular radiotelephone with data processing and data communications capabilities), a wireless telephone, a cellular telephone, a smart phone, a personal digital assistant (PDA) (e.g., that can include a radiotelephone, a pager, Internet/intranet access, etc.), a laptop computer, a personal computer, a tablet computer, or other types of computation or communication devices. In an exemplary implementation, TUEs 102 may include a pocket test user device. TUE 102 may operate according to one or more versions of the LTE communication standard.

External test server 104 may include a server configured to generate a test data flow 142 between the TUE 102 and external server 104. The test data flow may be used to determine the throughput of network 100 (e.g., transmission control protocol (TCP) and/or user datagram protocol (UDP) based transmissions), and may be implemented using a bandwidth performance measuring tool, such as hypertext transfer protocol performance testing tool (HTTPERF) or an Internet performance testing tool (IPERF). The test data flow may be transport layer (layer 4 (L4), or TCP) flow that may be used as a network performance measuring tool in network 100. The test data flow may be sent from the external test server 102 to the TUE 102 via particular network elements, such as a particular MME 122, SGW 124, PGW 128, etc. Although not shown in FIG. 1, the test data flow may be sent through other devices in network that may be positioned between illustrated components (e.g., router, repeaters, etc., between SGW 124 and eNB 134-2).

KPMs 108 may include small form factor probes (SFPs) that measure the performance of each network element. KPMs 108 may be implemented as part of a performance monitoring system to measure the ongoing performance of each network element in delivering the test data flow 142 based on key performance indicators (KPIs), such as described below with respect to FIGS. 2, 3A and 3B. For example, the KPIs may include jitter, frame loss, latency, or other measure of the data transmission performance of network 100. The KPMs 108 may measure the performance based on KPI's for data flows between particular network elements over time frames appropriate to the particular KPI (e.g., seconds or milliseconds for latency). As shown in FIG. 1, KPMs 108 may be implemented to measure the performance of PGW 128, MME 122, SGW 124, eNBs 134, etc., in transmitting test data flow 142 from external test server 104 to TUE 102.

PDN 110 includes a network that provides data services (e.g., via packets or any other Internet protocol (IP) datagrams). For example, PDN 110 may include the Internet, an intranet, an asynchronous transfer mode (ATM) network, etc.

EPC network 120 may include core network architecture of the 3rd Generation Partnership Project (3GPP) LTE wireless communication standard. In one example, EPC network 120 may include an all-IP packet-switched core network that supports high-speed wireless and wireline broadband access technologies. In another example, EPC network 120 may provide packet-switched voice services (e.g., which are traditionally circuit-switched) using an IP multimedia subsystem (IMS) network. EPC 120 may include MME 122, SGW 124, PGW 128, and internal test server 140.

PGW 128 includes one or more data transfer devices (or network devices), such as a gateway, a router, a switch, a firewall, a network interface controller (NIC), a hub, a bridge, a proxy server, an optical add/drop multiplexer OADM, or some other type of device that processes and/or transfers data. PGW 128 provides connectivity of TUE 102 to external packet data networks (e.g., to PDN 110) by being a traffic exit/entry point for TUE 102. As described briefly above, TUE 102 may connect to PGW 128 via one or more tunnels established between eNB 134 and PGW 128, such as one or more GPRS Tunneling Protocol (GTP) tunnels. TUE 102 may simultaneously connect to more than one PGW for accessing multiple PDNs. PGW 128 may perform policy enforcement, packet filtering for each user, charging support, lawful intercept, and packet screening. PGW 128 may also act as an anchor for mobility between 3GPP and non-3GPP technologies.

MME 122 is responsible for idle mode tracking and paging procedures (e.g., including retransmissions) for TUE 102. For example, MME 122 maintains information regarding a current state (e.g., powered on, location, etc.) of TUE 102. MME 122 is also involved in the bearer activation/deactivation process (e.g., for TUE 102) and operates to choose a particular SGW 124 for TUE 102 at an initial attach time and at a time of intra-LTE handover. In addition, MME 122 authenticates TUE 102 (e.g., via interaction with HSS 122). Non-access stratum (NAS) signaling terminates at MME 122 and MME 122 generates and allocates temporary identities to UEs (e.g., TUE 102).

Furthermore, MME 122 may check authorization of TUE 102 to connect to a service provider's Public Land Mobile Network (PLMN) and may enforce roaming restrictions for TUE 102. MME 122 may be a termination point in EPC network 106 for ciphering/integrity protection for NAS signaling and may handle security key management. MME 122 may provide a control plane function for mobility between LTE and second generation mobile telecommunications or third mobile generation telecommunications (2G/3G) 3GPP access networks with an S3 interface (i.e., an interface that provides the connection between a serving general packet radio service (GPRS) support node (SGSN) and MME 122 in an LTE network) terminating at MME 122.

SGW 124 routes and forwards user data packets, acts as a radio mobility anchor for a user plane during inter-eNB handovers, and also acts as an radio anchor for mobility between LTE and other 3GPP technologies (referred to as "inter-3GPP mobility"). As shown, SGW 124 is connected to eNBs 134 to provide a radio layer mobility control plane. In addition, SGW 124 manages and stores contexts associated with TUE 102 (e.g., parameters of an IP bearer service, network internal routing information, etc.).

Internal test server 140 may generate and/or control data flows between network devices within EPC 120. In one implementation, internal test server 140 may be implemented in conjunction with PPM 106 to monitor the performance of elements within network 100 to capture KPIs, such as packet loss, latency, jitter, and similar parameters.

PPM 106 may receive performance patterns (e.g., a latency pattern, a frame loss pattern, etc.) for each network node or element, including data transmission performance patterns from MME 122, SGW 124, PGW 128, etc. PPM 106 may perform KPI layer correlation (e.g., based on a rate of change of the KPI) to identify the root-cause of data transmission issues that may affect the quality of the data transmitted from external test server 104 to TUE 102. PPM 106 may use for pattern matching to find correlated elements that are degrading data transmission services, such as described below with respect to FIGS. 2 to 6.

AN 130 includes a communications network that connects subscribers (e.g., TUE 102) to a service provider. In one example, AN 130 may include a WiFi network or other access networks (e.g., in addition to E-UTRAN 132).

E-UTRAN 132 includes a radio access network capable of supporting high data rates, packet optimization, large capacity and coverage, etc. E-UTRAN 132 includes a plurality of eNBs 14.

eNBs 134 includes network devices that operate according to one or more versions of the LTE communication standard. For example, eNBs 134 may be configured to respond to UE requests, forward information regarding TUEs 102 to MME 122 and/or SGW 124, set up tunneling sessions with other devices (e.g., SGW 124 and PGW 128), etc. eNBs 134 are base stations in network 100 and may include control plane connections to other network elements.

In implementations described herein, data transmission performance patterns associated with particular may be monitored and, in some instances, recorded. Performance patterns associated with particular data transmission issues may be identified and pattern matching processes may be implemented to correlate to the data transmission issues with root-causes of the data transmission issues (e.g., a root-cause component that introduces the data transmission issue to the data flow).

FIG. 2 is a diagram of exemplary functional components of PPM 106. PPM 106 may comprise machine-readable instructions, hardware, or a combination of hardware and machine-readable instructions. PPM 106 may include a test control module 210, a performance pattern identification module 220, and an optimization module 230. According to an embodiment, PPM 106 may be a component of a testing device, such as external test sever 104 or internal test server 140 as described with respect to FIG. 1 above. Alternatively, PPM 106 may be implemented as a separate device that is operably connected to the testing device (e.g., PPM 106 may be connected to internal test server 140 via a wireless or wired connection) or deployed at a separate location that receives reports from KPMs 108. The configuration of components of PPM 106 illustrated in FIG. 2 is for illustrative purposes only. Other configurations may be implemented. Therefore, PPM 106 may include additional, fewer and/or different components than those depicted in FIG. 2.

Test control module 210 may implement and identify test data flows to determine performance patterns associated with network elements, for example in conjunction with external test server 104. Test control module 210 may perform monitoring functions in network 100 for data transmission performance issues. Test control module 210 may also initiate diagnostic functions for data transmission issues in network 100 based on identified data transmission issues. For example, test control module 210 may receive reports of data transmission issues in the network 100 (e.g., from user devices) and generate test flows and/or identify baseline flows (prior to introduction of data transmission issues) from external test server 104 to pocket test applications running in TUEs 102.

Performance pattern identification module 220 may receive performance pattern reports from (or associated with) particular network elements (e.g., a particular SGW 124, eNB 134, etc.). KPMs 108 may provide performance pattern reports regarding performance pattern associated with network elements based on KPIs to performance pattern identification module 220. KPMs 108 may provide the performance pattern reports periodically, based on data transmission events, or constantly. The status report may include a performance pattern based on KPIs for each network element (i.e., eNB 134), such as a latency pattern, frame loss pattern, etc., for example as shown in FIGS. 3A and 3B. The performance pattern for each network component that transmits the test data flow may be measured and provided to performance pattern identification module 220.

FIG. 3A shows performance patterns 300 for baseline behavior of the data transmission. The performance patterns 300 in this instance include a latency pattern 310 and a frame loss pattern 320. The performance patterns 300 for baseline behavior may be measured at a point in network 100 at which the test data flow does not include any data transmission issues (i.e., the data transmission performance pattern is a "clean" performance pattern at that point in the network). The latency pattern 310 is measured in terms of latency 302 and the frame loss pattern 320 in terms of frame loss 322 over a monitored time 304. The time frame of the performance patterns may be based on the corresponding KPI (e.g., milliseconds for latency). The latency of the test data flow in this instance is constant, reflecting that the test data flow does not include data transmission issues at the particular point in network 100 at which the clean performance pattern was measured (e.g., at PGW 128 for the data transmission between PGW 128 and SGW 124). Similarly, the frame loss pattern 320 indicates that there is minimal frame loss at that particular point in network 100. In other words, latency pattern 310 and frame loss pattern 320 reflect the performance pattern of the test data flow at a point in the network prior to introduction of the data transmission issues to the test data flow via a root-cause component for data transmission issues.

FIG. 3B shows performance patterns 350 measured at a point in network 100 at which the test data flow includes data transmission issues (i.e., the data transmission performance pattern is a "degraded" performance pattern at that point in the network). The latency pattern 360 of the test data flow in this instance fluctuates, reflecting that the test data flow includes data transmission issues at the particular point in network 100 at which the degraded performance pattern was measured (e.g., after SGW 124 for the data transmission between SGW 124 and eNB 134). Similarly, the frame loss pattern 320 indicates that there is increasing frame loss at that particular point in network 100. In other words, latency pattern 310 and frame loss pattern 320 reflect the performance pattern of the test data flow at a point in the network after data transmission issues have been introduced to the test data flow via a root-cause component for data transmission issues. The degraded performance patterns 350 may indicate a data transmission issue that currently affects the data transmission received by TUE 102. Alternatively, the degraded performance pattern may be a precursor to data transmission issues that may be experienced by the user. For example, if the performance pattern indicates that the latency is increasing, eventually the test data flow may experience packet loss. Once packet loss occurs, the exponential function will result in decreased throughput because of the circular function of resending packets.

In instances in which data transmission issues are identified in the network, performance pattern identification module 220 may implement pattern matching to locate correlated elements that are degrading the data transmission. Performance pattern identification module 220 may implement the pattern matching process in a similar manner as described below with respect to FIG. 6 to determine common points of failure and where problems occur based on KPIs. Performance pattern identification module 220 may determine a particular type of data transmission issue based on matching the performance pattern with a previously stored performance pattern that corresponds to a particular type of data transmission issue and/or root-cause.

Optimization module 230 may perform optimization processes to address the identified data transmission issues based on results generated by performance pattern identification module 220 in the performance matching process. For example, optimization module 230 may provide machine-readable instructions for a reconfiguration engine to dynamically redirect available resources in instances in which the data transmission is starting to back up at a particular component in the network. For example, optimization module 230 may redirect traffic e.g. from web traffic to voice traffic, change weights of queues or increase the buffer length. In some implementations optimization module 230 may change the priority that is assigned to a particular application on a central processing unit (CPU) of the root-cause component (i.e., increased CPU cycles for the particular application). In addition to shifting traffic, optimization module 230 may provide instructions to take action to take defective network elements out of the network 100. Optimization module 230 may also provide results to technicians in instances in which self-optimization does not provide an appropriate resolution of the data transmission issues (e.g., optimization module 230 may provide a notification that additional bandwidth may be required).

Figure 5A:
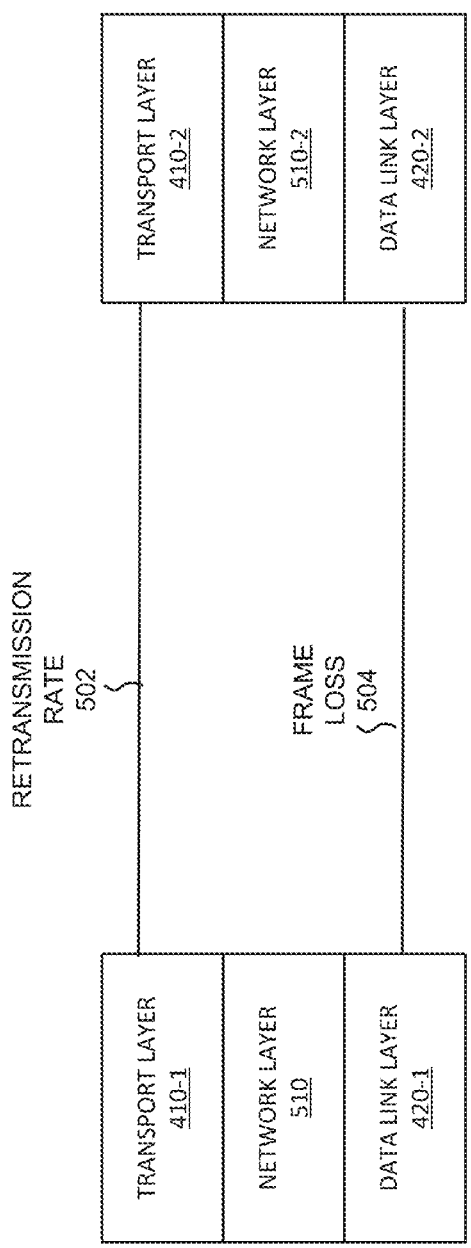
FIGS. 5A and 5B are diagrams illustrating data transmission issues in the network of FIG. 4.
Figure 5B:
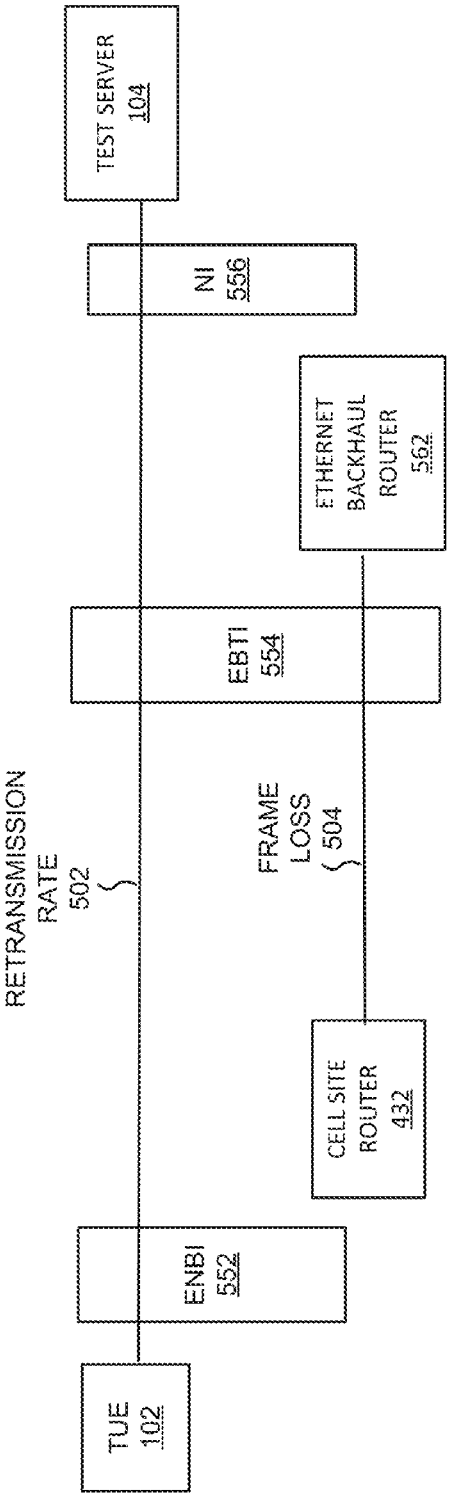

FIG. 4 illustrates a tree structure network topology 400. As shown in FIG. 4, network topology 400 may include network components (or nodes) including PGW 128, and a plurality of SGWs 124, next generation multiplayer switches (ngMLSs) 430, cell site routers (CSRs) 432 and TUEs 102 (illustrated as TUE 102-1 to TUE 102-x), arranged at different levels throughout the tree structure network topology. Although a particular configuration of been illustrated in FIG. 1 for simplicity. In practice, there may be more or fewer devices or components and the devices or components may be arranged differently in the network topology. Data transmission issues in network topology 400 are described with respect to FIGS. 5A and 5B illustrate errors in layers of the network 500.

Network topology 400 may be arranged in hub and spoke model in which an initial data transmission may be sent from PGW 128 to a particular TUE 102 via intermediate components, such as a particular SGW 124, ngMLs 430 and CSR 432. CSRs 432 and ngMLS 430 are network devices that The tree structure network topology 400 also includes an associated representation of a transport layer 410 that may provide end to end communication services for applications (i.e., from PGW 124 to TUE 102) and data link layers 420-1 to 420-4 that transfer data between each level of network components.

In some instances, a component or device may have a data transmission issue that leads to degradation of performance. For example, PGW 128 may transmit data with a clean performance pattern (CPP) 440 to a particular TUE 102 (e.g., TUE 102-x). However, in some instances, data transmission errors may be introduced to the data flow. The data transmission errors may be observed (or measured) at different layers of the network topology 400.

The systems and methods may identify a sequence of network components that transmit a test data flow. The systems may identify matched performance patterns correlated with data transmission issues. The systems may identify a highest network component in the network topology at which the matched performance pattern occurs as the root-cause component.

As shown in FIG. 5A, retransmission rate 502 is measured across the transport layer 410 (shown in FIG. 5A as transport layer 410-1 to 410-2) while frame loss occurs at the data link layer 420 (shown in FIG. 5A as data link layer 420-1 to data link layer 420-2).

In some instances, as described with respect to FIG. 5B, the systems and methods may be applied to determine a root-cause component of a data transmission issue. For example, a data transmission between a TUE 102 and an external test server 104 may be affected by different data transmission issues that manifest (i.e., cause change) in the retransmission rate 502 and frame loss 504 measured at different layers and/or across different components of the network. The data transmission issues may include Radio frequency (RF) or eNB issues (shown in FIG. 5B as ENBI 552), Ethernet backhaul transport issues (shown in FIG. 5B as EBTI 554), and internal or external network issues (shown in FIG. 5B as NI 566). In many instances, ENBI 552 and NI 566 may affect the retransmission rate 502 while EBTI 554 may affect both the retransmission rate 502 and frame loss 504. The time frame over which the different data transmission issues manifest and/or degrade the quality of data transmission in the network may vary from milliseconds to minutes to days.

EBTI 554 may include data transmission issues as a result of dirty fiber, laser deterioration over time, fiber degradation over time, etc. In instances in which the EBTI 554 include laser deterioration over time, the systems may predict failure of the lasers by querying the laser light levels of boxes (e.g., tracking the laser light levels over months) and extrapolating to determine a point at which the laser should be replaced in order to maintain a target performance. Similarly, fiber may degrade over time resulting in polarization mode dispersal.

NI 566 may include incorrect data transmission settings, such as incorrect buffer settings that affect the latency of data transmission in the network. The system may measure different information elements associated with data transmission over time and predict future problems based on a precursor of another problem manifesting in the performance pattern (e.g., the system may model the point at which data transmission issues pass a predetermined threshold using a predictive model). For example, the system may predict changes in latency based on the relationship between buffer use and latency (e.g., the more full the buffer gets the more latency in the network increases).

Figure 6:
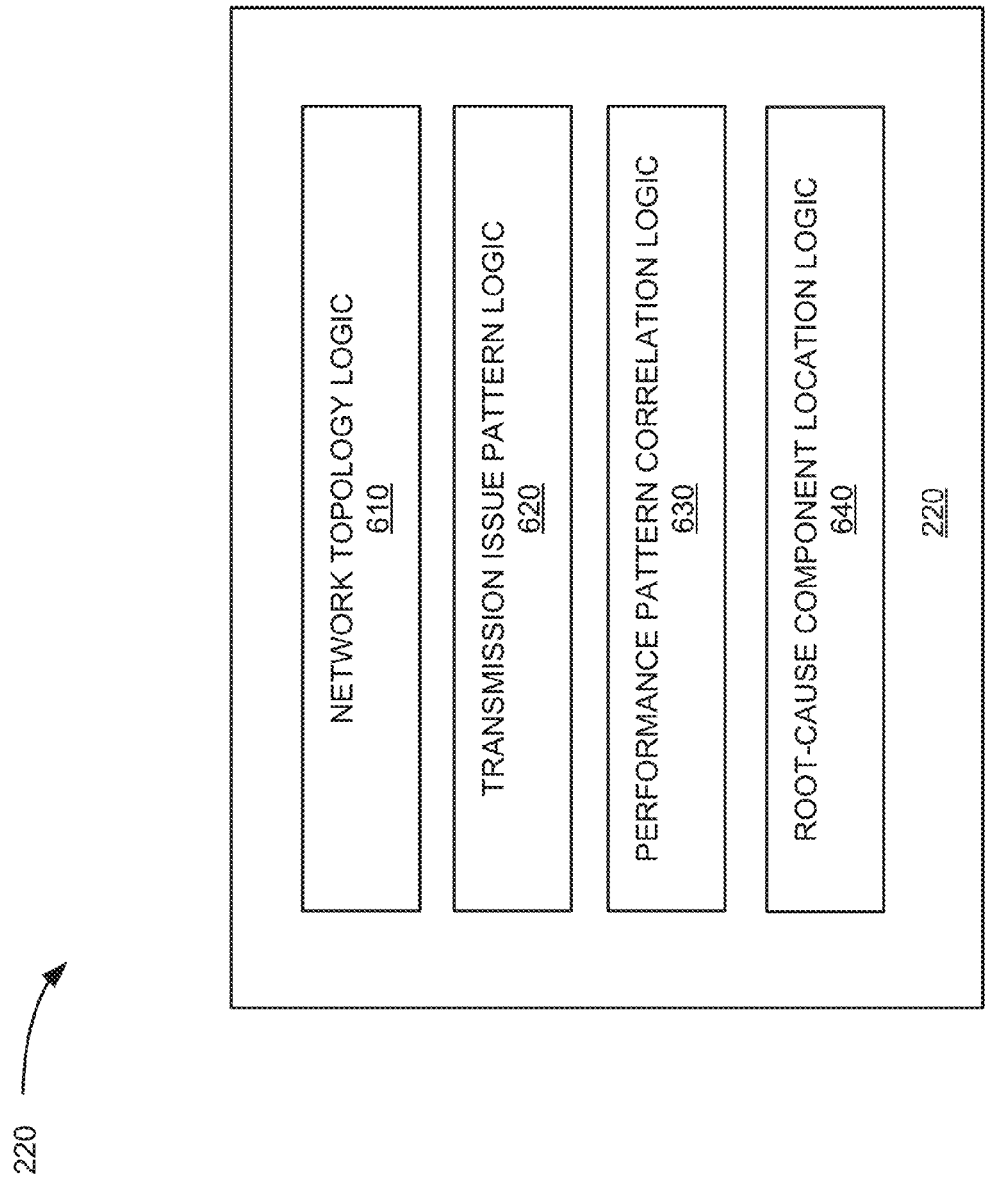
FIG. 6 is a diagram of logic components of the performance pattern matching module of FIG. 4.

FIG. 6 illustrates logic components of performance pattern matching module 220. As shown in FIG. 6, performance pattern matching module 220 may include a network topology logic 610, a transmission issue pattern logic 620, a performance pattern correlation logic 630 and a root-cause component location logic 640.

Network topology logic 610 may identify a network topology of a network, including interconnections between network elements. Network topology logic 610 may provide a map that may be used to trace the path of data flows in the network.

Transmission issue pattern logic 620 may maintain a database of performance patterns and identified interrelationships between KPIs (at particular components or across a chain of components that transmit a data flow) that allows the system to predict the probable incidence of data transmission issues in the network. Transmission issue pattern logic 620 may identify and model KPI's (e.g., Poisson model, etc.) for network elements. Transmission issue pattern logic 620 may identify interrelationships between different KPIs and correlate the different KPI's to determine recurring anomalies and extrapolate (e.g., using Markov chains) to determine a predictive model of data transmission issues in the network and associated model degraded performance pattern. For example, jitter and frame loss may indicate borderline failures. Transmission issue pattern logic 620 may take each type of performance pattern over a time period and match the performance pattern to data transmission issues. Transmission issue pattern logic 620 may correlate different categories of data associated with the network elements based on the different KPI-based mathematical models associated with the network elements (e.g., operating systems and applications).

Transmission issue pattern logic 620 may identify different inherent structural dependencies and anomalies associated with particular network elements. For example, transmission issue pattern logic 620 may identify correlated behavior based on changes one or two standard deviations away from baseline (i.e., dependence between different KPIs and network elements). In some implementations, the models of performance patterns associated with the test data flow may be adjusted based on identified sources of other data transmission issues in instances in which there are multiple sources of data transmission issues in the network.

Performance pattern matching logic 630 may identify matches in performance pattern and data transmission related KPIs. Performance pattern matching logic 630 may perform a process of searching for a match between performance patterns at a particular network component that may be correlated with a performance pattern based on a KPI for another network component to identify root-cause components in the network topology (e.g., changes in a first KPI at a first component may eventually trigger changes in another KPI at another network component).

Figure 7:
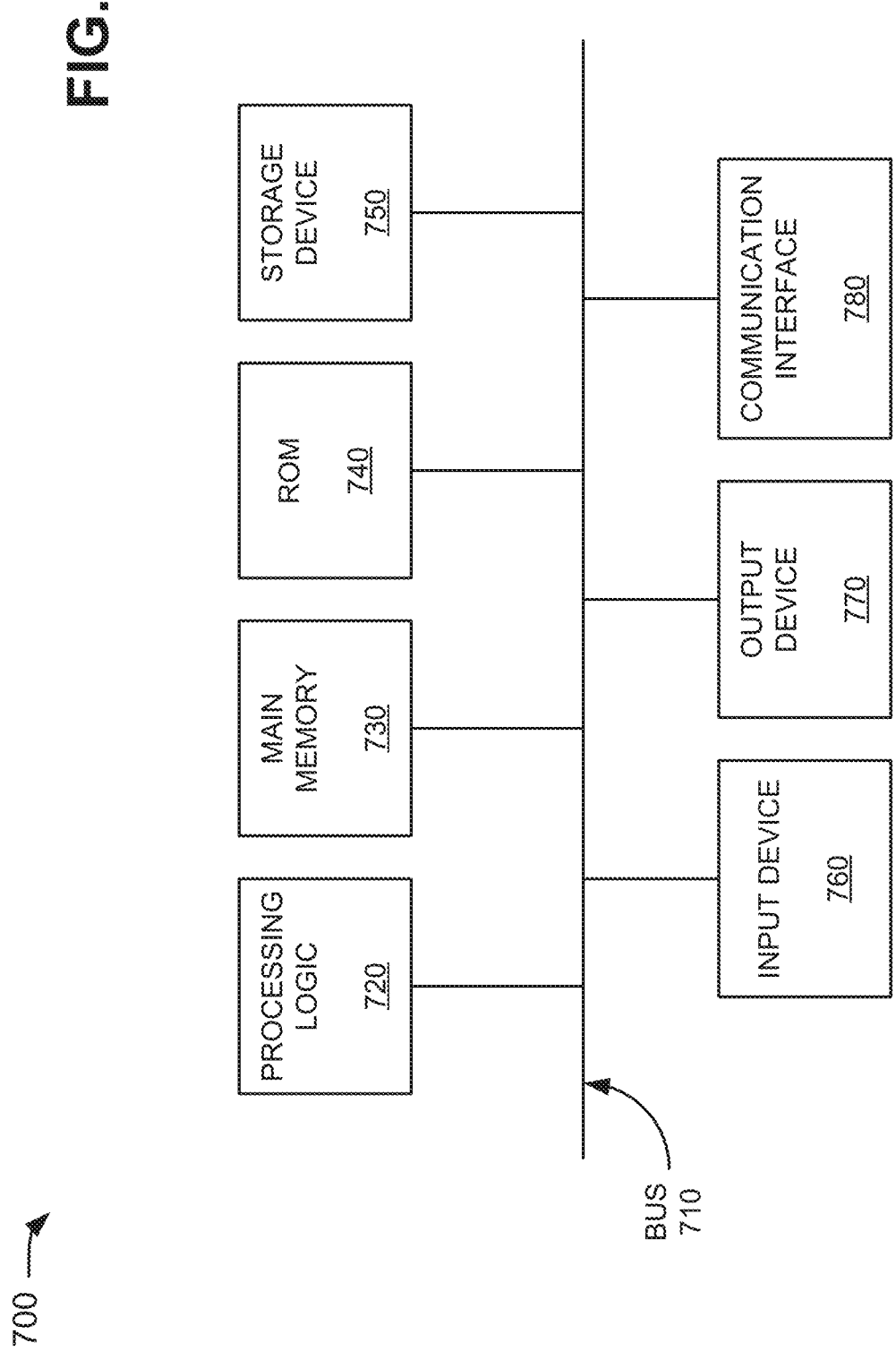
FIG. 7 is a block diagram of exemplary components of a device that may correspond to one of the devices of FIGS. 1-4.

FIG. 7 is a diagram of exemplary components of a device 700 that may correspond to TUE 102, one or more devices in AN 104, EPC 106, PDN 110, E-UTRAN 132, eNB 134, MME 122, HSS 122, SGW 124, PGW 128, ngMLS 430, CSR 432, or Ethernet backhaul router 562 as described in FIGS. 1-6 above. As shown in FIG. 7, device 700 may include a bus 710, a processor 720, a memory 730, an input device 740, an output device 750, and a communication interface 760.

Bus 710 may permit communication among the components of device 700. Processor 720 may include one or more processors or microprocessors that interpret and execute instructions. In other implementations, processor 720 may be implemented as or include one or more application specific integrated circuits (ASICs), field programmable gate arrays (FPGAs), or the like.

Memory 730 may include a random access memory (RAM) or another type of dynamic storage device that stores information and instructions for execution by processor 720, a read only memory (ROM) or another type of static storage device that stores static information and instructions for the processor 720, and/or some other type of magnetic or optical recording medium and its corresponding drive for storing information and/or instructions.

Input device 740 may include a device that permits an operator to input information to device 700, such as a keyboard, a keypad, a mouse, a pen, a microphone, one or more biometric mechanisms, and the like. Output device 750 may include a device that outputs information to the operator, such as a display, a speaker, etc.

Communication interface 760 may include one or more transceivers that enables device 700 to communicate with other devices and/or systems. For example, communication interface 760 may include mechanisms for communicating with other devices, such as other devices of network 100.

As described herein, device 700 may perform certain operations in response to processor 720 executing software instructions contained in a computer-readable medium, such as memory 730. A computer-readable medium may include a non-transitory memory device. A memory device may include space within a single physical memory device or spread across multiple physical memory devices. The software instructions may be read into memory 730 from another computer-readable medium or from another device via communication interface 760. The software instructions contained in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

Although FIG. 7 shows exemplary components of device 700, in other implementations, device 700 may include fewer components, different components, differently arranged components, or additional components than depicted in FIG. 7. As an example, in some implementations, input device 740 and/or output device 750 may not be implemented by device 700. In these situations, device 700 may be a "headless" device that does not explicitly include an input or an output device. Alternatively, or additionally, one or more components of device 700 may perform one or more other tasks described as being performed by one or more other components of device 700.

Figure 8:
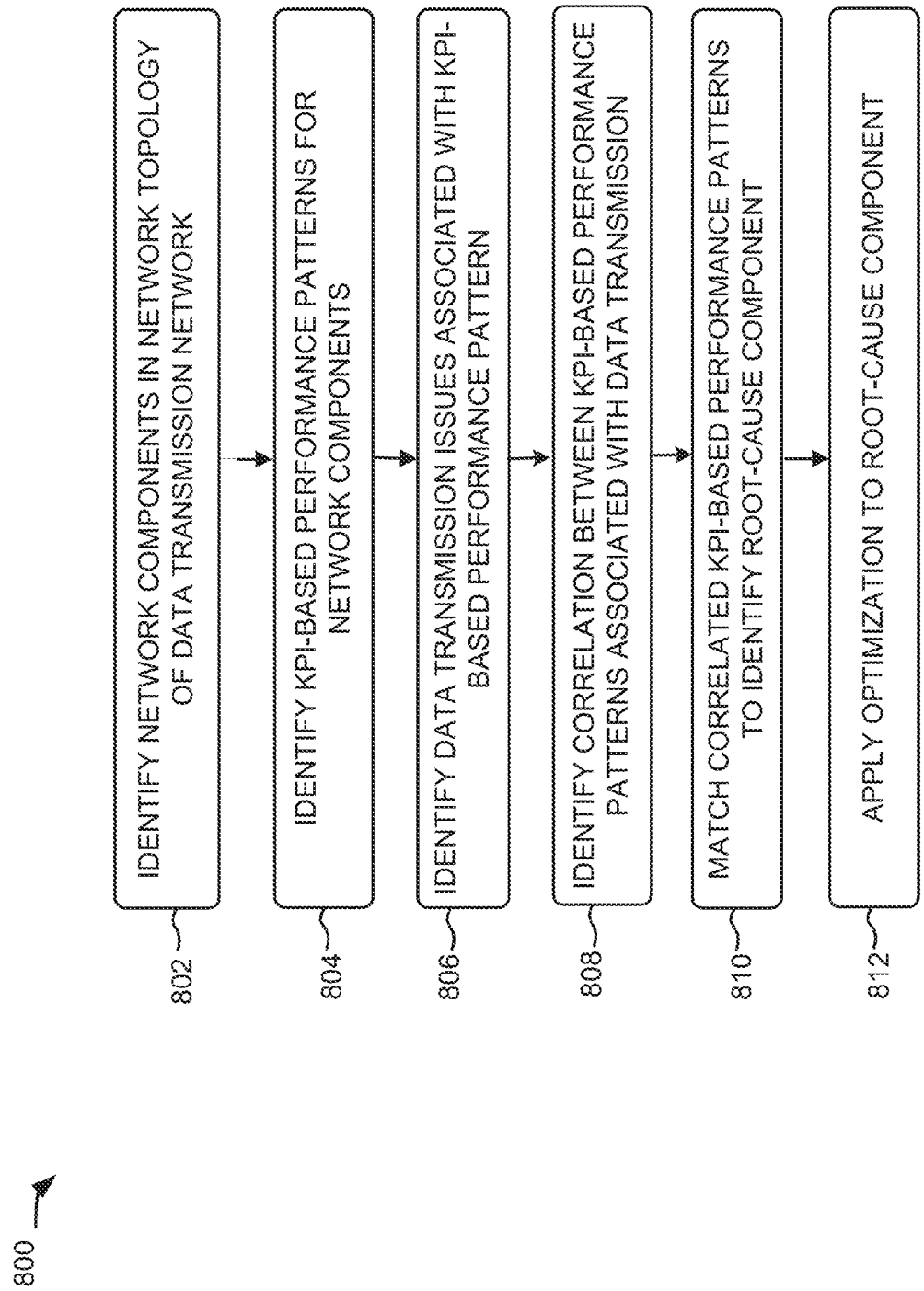
FIG. 8 is a flow chart of another exemplary process to identify a root-cause component of a degraded data transmission performance pattern according to an implementation described herein.

FIG. 8 is a flow chart of an exemplary process for file recovery and error protection of a multicast/broadcast transmission according to implementations described herein. Process 800 is described with respect to network 100 shown in FIG. 1, for illustrative purposes. In one implementation, process 800 may be performed PPM 106. In another implementation, some or all of process 800 may be performed by another device or group of devices, including or PPM 106.

As shown in FIG. 8, process 800 may begin when PPM 106 identifies a network topology associated with a data transmission network (block 802). PPM 106 may identify network components in the network and interrelationships between the network components.

At block 804, PPM 106 may determine performance patterns based on KPIs for each of the network components (i.e., KPI-based performance patterns). For example, PPM 106 may monitor a signal transmitted from an external test server 104 to TUE 102 (e.g., using IPERF or similar network testing tool). PPM 106 may identify KPIs associated with each of the different network components. PPM 106 may identify latency and frame loss as KPI's associated with a particular component. PPM 106 may receive performance patterns from KPMs 108 associated with the network components.

PPM 106 may identify data transmission issues in the network that are associated with a particular performance pattern (block 806). For example, PPM 106 may identify a data transmission issue and identify the performance pattern of the network component at which the data transmission issue is identified.

At block 808, PPM 106 may identify a model degraded performance pattern associated with the data transmission issue. For example, PPM 106 may analyze performance patterns for the network components based on model degraded network performance patterns associated with particular data transmission issues to determine network components that are likely to generate data transmission issues.

At block 808, PPM 106 may match the model degraded performance pattern to the data transmission performance patterns to form matched performance patterns. PPM 106 may identify correlation between KPI-based performance patterns associated with data transmission in the network.

At block 810, PPM 106 may match correlated KPI-based performance patterns to identify a root-cause component for a data transmission issue. For example, PPM 106 may identify a root-cause component for the data transmission issue based on a correlation between the performance patterns for the different KPIs for network components that transmit the data flow which reflects the data transmission issue. The correlation may be between same or different KPI's and may be direct or indirect.

PPM 106 may apply optimization methods to the identified root-cause component (block 812). For example, PPM 106 may correct for latency issues on a queue size level by adjusting the buffer size. In other implementations, a load balancer (not shown) may redirect traffic in the network to reduce traffic problems associated with particular network components.

Systems and/or methods described herein may record performance patterns based on KPIs for data transmission for different network components and correlate the performance pattern to a root-cause problem and the root-cause component.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computer-implemented method comprising:
    identifying a plurality of network components in a network topology of a data transmission network;
    identifying at least one data transmission performance pattern based on at least one key performance indicator (KPI) for each of the plurality of network components;
    identifying at least one data transmission issue in the network;
    identifying a model degraded performance pattern associated with the at least one data transmission issue;
    matching the model degraded performance pattern to the at least one data transmission performance pattern to form at least one matched performance pattern; and
    identifying a root-cause component for the at least one data transmission issue from the plurality of network components based on the at least one matched performance pattern, wherein identifying the root-cause component comprises identifying a sequence of network components that transmit a test data flow and identifying a highest network component in the network topology at which the at least one matched performance pattern occurs as the root-cause component.

2. The computer-implemented method of claim 1, further comprising:
    optimizing the network based on the identified root-cause component and the at least one data transmission issue.

3. The computer-implemented method of claim 2, wherein optimizing the network further comprises:
    redirecting data traffic in the network to reduce traffic problems associated with the root-cause component.

4. The computer-implemented method of claim 1, wherein identifying the at least one data transmission performance pattern based on the at least one KPI further comprises:
    identifying the data transmission performance patterns based on at least one of latency, jitter or frame loss.

5. The computer-implemented method of claim 1, wherein identifying the at least one data transmission issue, further comprises:
    identifying at least one of a radio frequency issue or an eNodeB issue.

6. The computer-implemented method of claim 1, wherein identifying the at least one data transmission issue, further comprises:
    identifying an Ethernet backhaul transport issue.

7. The computer-implemented method of claim 1, wherein identifying the at least one data transmission issue, further comprises:
    identifying at least one of an internal network issue or an external network issue.

8. The computer-implemented method of claim 1, wherein identifying the at least one performance pattern further comprises;
    sending a test data flow through the network topology; and
    recording the performance patterns associated with each of the plurality of network components.

9. The computer-implemented method of claim 1, wherein identifying the at least one data transmission issue in the network further comprises:
    identifying a performance pattern that is a precursor to the at least one data transmission issue.

10. A device, comprising:
    a memory to store a plurality of instructions; and
    a processor configured to execute instructions in the memory to:
        identify a plurality of network components in a network topology of a data transmission network;
        identify at least one data transmission performance pattern based on at least one key performance indicator (KPI) for each of the plurality of network components;
        identify at least one data transmission issue in the network;
        identify a model degraded performance pattern associated with the at least one data transmission issue;
        match the model degraded performance pattern to the at least one data transmission performance pattern to form at least one matched performance pattern; and
        identify a root-cause component for the at least one data transmission issue from the plurality of network components based on the at least one matched performance pattern, wherein identifying the root-cause component comprises identifying a sequence of network components that transmit a test data flow and identifying a highest network component in the network topology at which the at least one matched performance pattern occurs as the root-cause component.

11. The device of claim 10, the processor is further configured to:
    optimize the network based on the identified root-cause component and the at least one data transmission issue.

12. The device of claim 11, wherein, when optimizing the network, the processor is further configured to:
    redirect data traffic in the network to reduce traffic problems associated with the root-cause component.

13. The device of claim 10, wherein, when identifying the at least one data transmission performance pattern, the processor is further configured to:
    identifying the data transmission performance patterns based on at least one of latency, jitter or frame loss.

14. The device of claim 10, wherein, when identifying the at least one data transmission issue, the processor is further configured to:
    identify at least one of a radio frequency issue or an eNodeB issue.

15. The device of claim 10, wherein, when wherein identifying the at least one data transmission issue, the processor is further configured to:

identify an Ethernet backhaul transport issue, wherein the Ethernet backhaul transport issue includes at least one of data transmission issues as a result of dirty fiber, laser deterioration over time, or fiber degradation over time.

16. The device of claim 10, wherein, when identifying the at least one performance pattern, the processor is further configured to;
   send a test data flow through the network topology; and
   record the performance patterns associated with each of the plurality of network components.

17. A non-transitory computer-readable medium including instructions to be executed by a processor, the instructions including one or more instructions, when executed by the processor, for causing the processor to:
   identify a plurality of network components in a network topology of a data transmission network;
   identify at least one data transmission performance pattern based on at least one key performance indicator (KPI) for each of the plurality of network components;
   identify at least one data transmission issue in the network;
   identify a model degraded performance pattern associated with the at least one data transmission issue;
   match the model degraded performance pattern to the at least one data transmission performance pattern to form at least one matched performance pattern; and
   identify a root-cause component for the at least one data transmission issue from the plurality of network components based on the at least one matched performance pattern, wherein identifying the root-cause component comprises identifying a sequence of network components that transmit a test data flow and identifying a highest network component in the network topology at which the at least one matched performance pattern occurs as the root-cause component.

18. The non-transitory computer-readable medium of claim 17, wherein, when identifying the root-cause component, the one or more instructions further includes instructions to:
   send a test data flow through the network topology; and
   record the performance patterns associated with each of the plurality of network components.

19. The non-transitory computer-readable medium of claim 17, wherein, the one or more instructions further include instructions to:
   optimize the network based on the identified root-cause component and the at least one data transmission issue.

20. The non-transitory computer-readable medium of claim 19, wherein, when optimizing the network, the one or more instructions further include instructions to:
   redirect data traffic in the network to reduce traffic problems associated with the root-cause component.

* * * * *